United States Patent [19]

Toriyabe et al.

[11] Patent Number: 4,531,626
[45] Date of Patent: Jul. 30, 1985

[54] PROCESS FOR DISTRIBUTING DISKS AND APPARATUS THEREFOR

[75] Inventors: Tetsuo Toriyabe; Kunihiko Ooya; Akira Nogami; Kazunori Sugawara, all of Iwatsuki, Japan

[73] Assignee: Hokkai Can Co., Ltd., Toyko, Japan

[21] Appl. No.: 457,592

[22] Filed: Jan. 13, 1983

[30] Foreign Application Priority Data

Jan. 13, 1982 [JP] Japan .................................. 57-2785

[51] Int. Cl.³ .............................................. B65G 49/00
[52] U.S. Cl. ..................................... 198/347; 198/436; 414/108
[58] Field of Search ........................ 198/347, 425, 436; 414/37, 86, 108, 114, 786

[56] References Cited

U.S. PATENT DOCUMENTS

| | | | |
|---|---|---|---|
| 2,718,313 | 9/1955 | O'Neil | 414/69 X |
| 3,182,819 | 5/1965 | Groom | 414/37 |
| 3,353,651 | 11/1967 | Witmer | 198/347 |
| 3,616,951 | 11/1971 | St. Clari et al. | 414/117 X |
| 3,620,386 | 11/1971 | Bivans et al. | 414/108 |
| 3,827,582 | 8/1974 | Lederer | 198/425 X |
| 3,878,945 | 4/1975 | Mojden et al. | |
| 3,971,189 | 7/1976 | Mojden et al. | |
| 4,394,902 | 7/1983 | Mazzoni | 198/436 |

FOREIGN PATENT DOCUMENTS 55-48048  12/1980  Japan .

Primary Examiner—Robert J. Spar
Assistant Examiner—Janice Krizek
Attorney, Agent, or Firm—Birch, Stewart, Kolasch & Birch

[57] ABSTRACT

An apparatus and method for distributing disks includes a slide cutter member for dividing a row of stacked disks being conveyed at a continuous constant speed at every predetermined number thereof, one after another, to form cylindrical stacked bodies thereof. An inclined passage is positioned adjacent to and extending at substantially a right angle with respect to the conveying direction of said stacked disks. The inclined passage includes a lower portion being inclined upwardly to a forward end. The slide cutter supplies every cylindrical stacked body one after another to the inclined passage. A push-up member is provided for intermittently pushing upwards the cylindrical stacked bodies supplied one after another to the lower portion of the inclined passage. A holding member is provided for holding upwardly moved one or more cylindrical stacked bodies at an upper stage position on the lower portion of the inclined passage. The apparatus and method further includes a distributing member for distributing at least two of the cylindrical stacked bodies arranged in a row and in mutual parallel relationship on the inclined passage to a side portion of the inclined passage. Stacked bodies may be stored adjacent the forward end of the inclined passage. A feeder is provided for rolling down the spare cylindrical stacked bodies from the upper portion of the inclined passage when the supplying of the cylindrical stacked bodies to the lower portion of the inclined passage is stopped.

18 Claims, 21 Drawing Figures

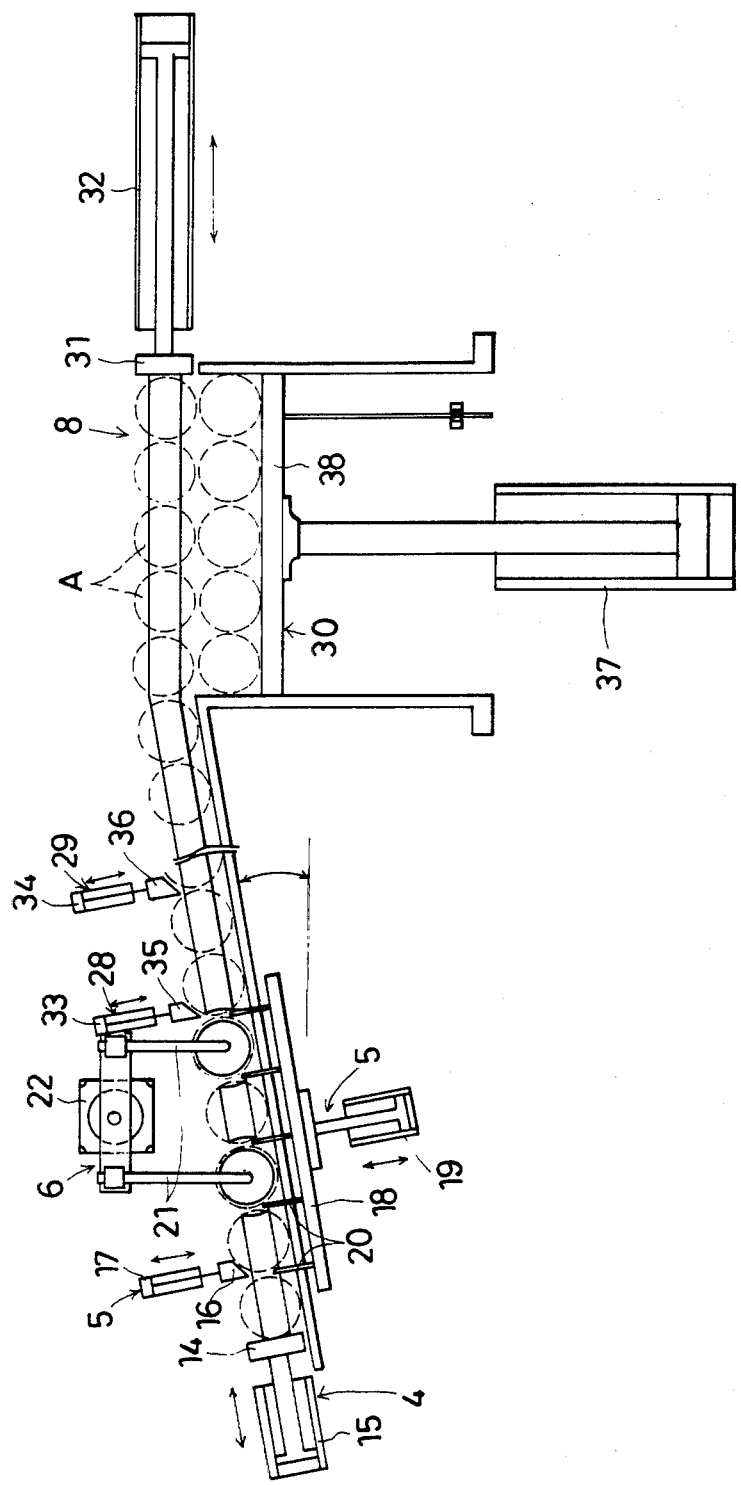

FIG.4 (1)
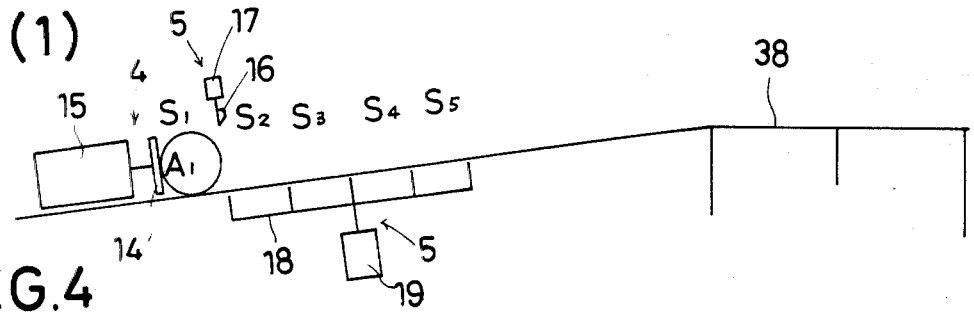
FIG.4 (2)
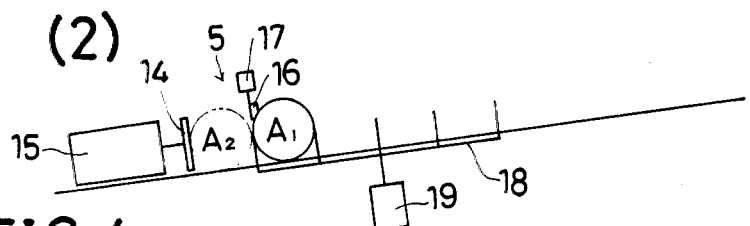
FIG.4 (3)
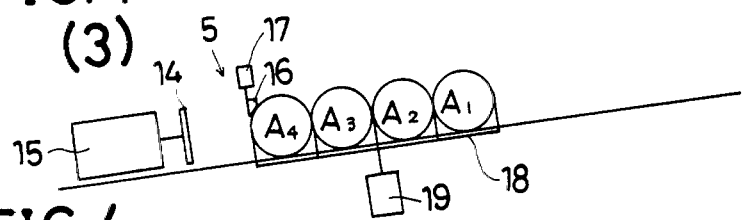
FIG.4 (4)
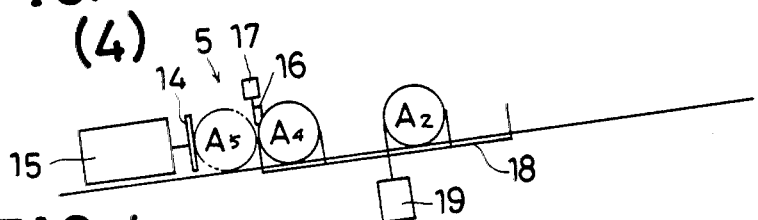
FIG.4 (5)
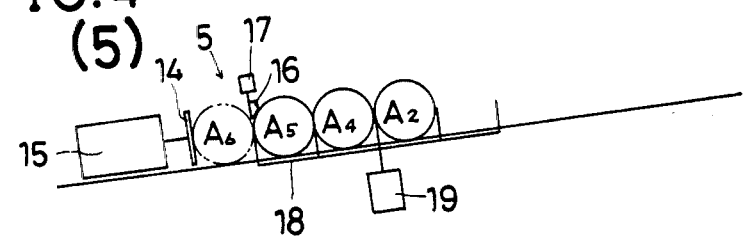

FIG.4 (6)
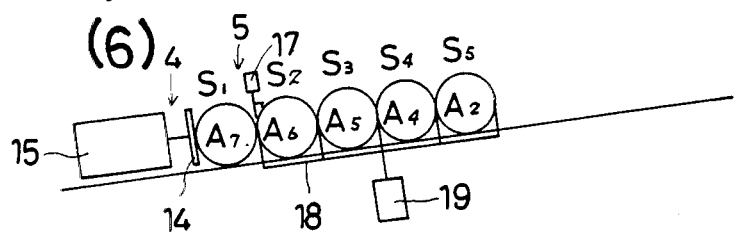
FIG.4 (7)
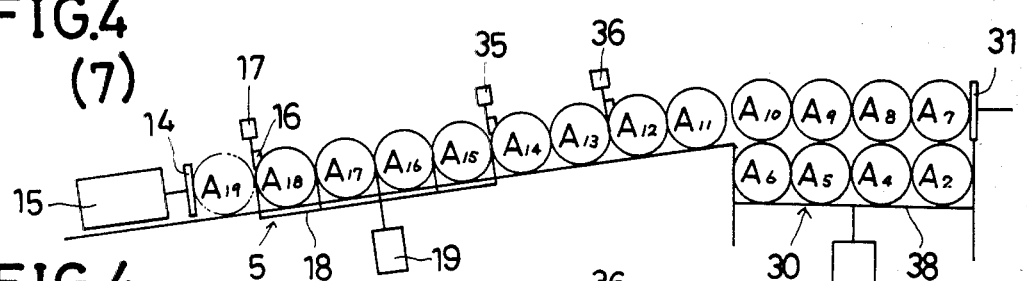
FIG.4 (8)
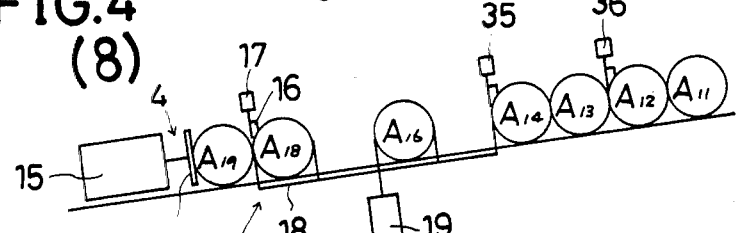
FIG.4 (9)
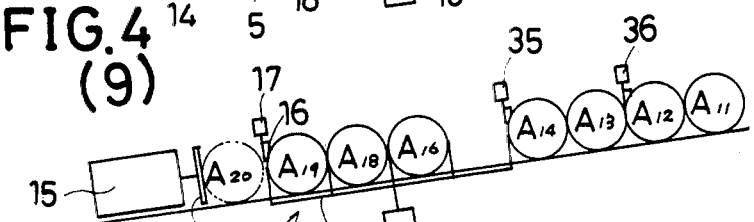
FIG.4 (10)
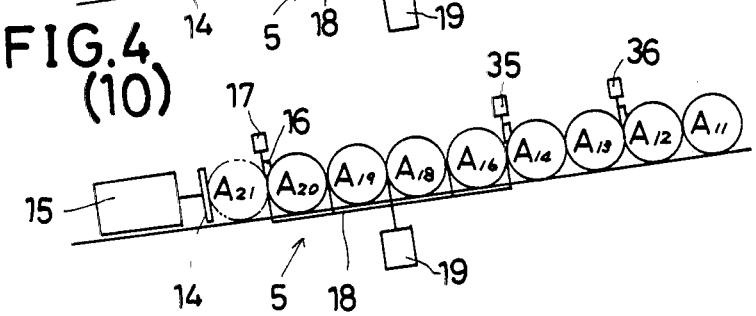

FIG. 5 (1)
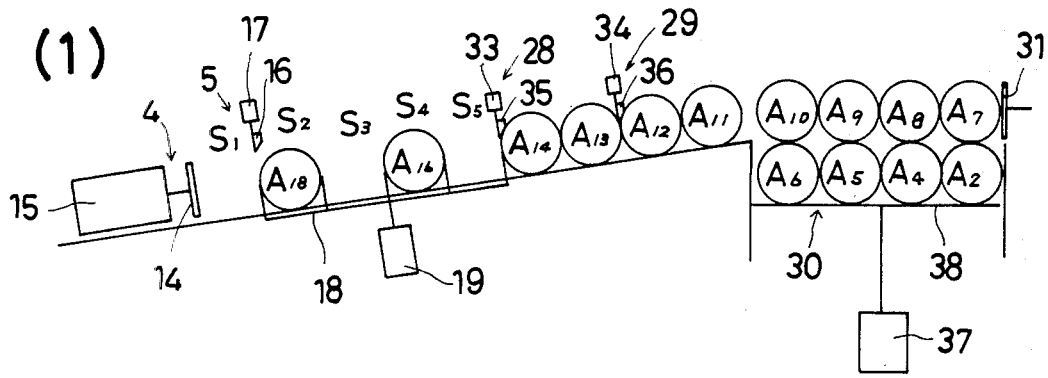
FIG. 5 (2)
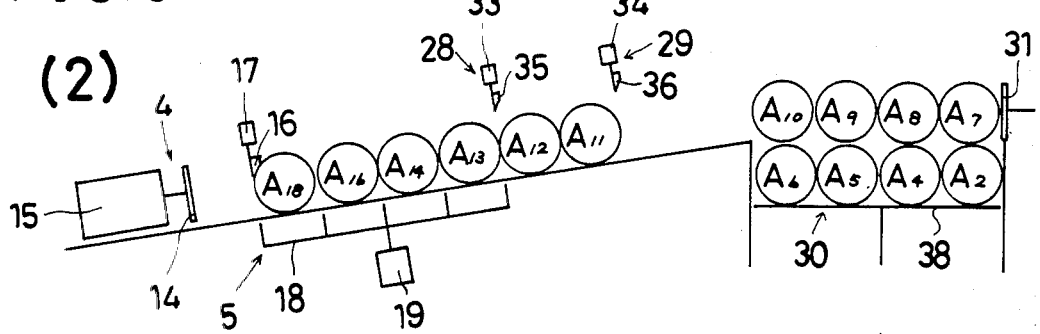
FIG. 5 (3)
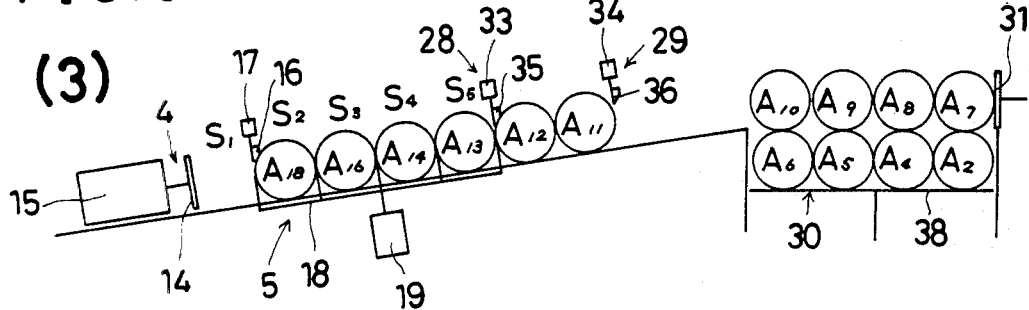

FIG. 5 (4)
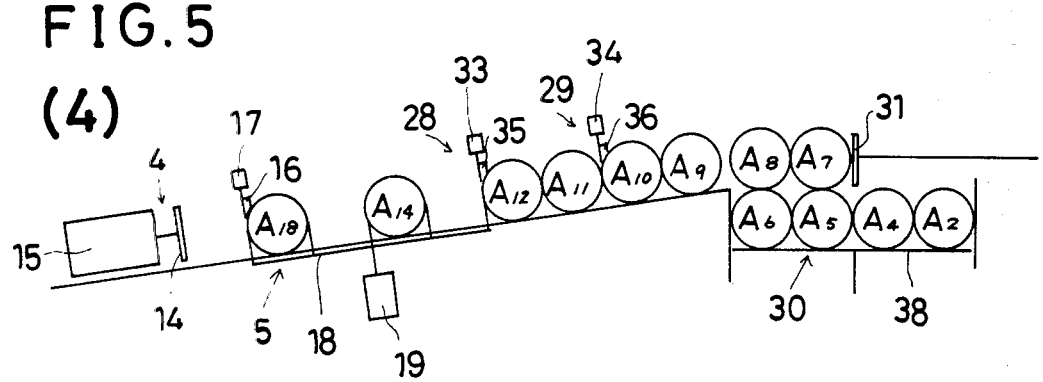
FIG. 5 (5)
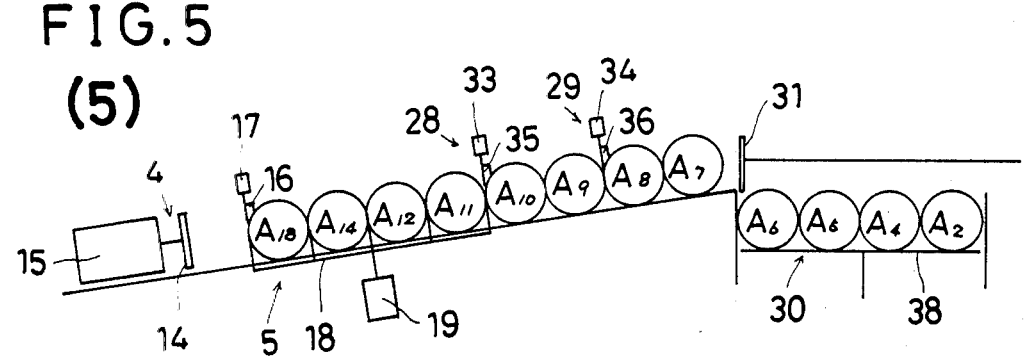
FIG. 5 (6)
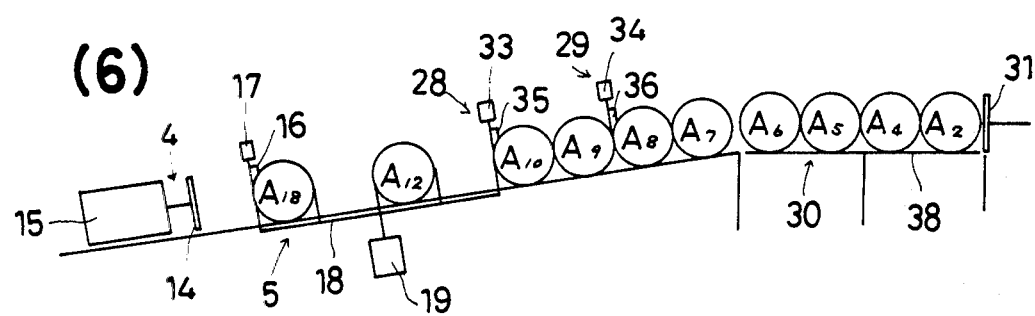

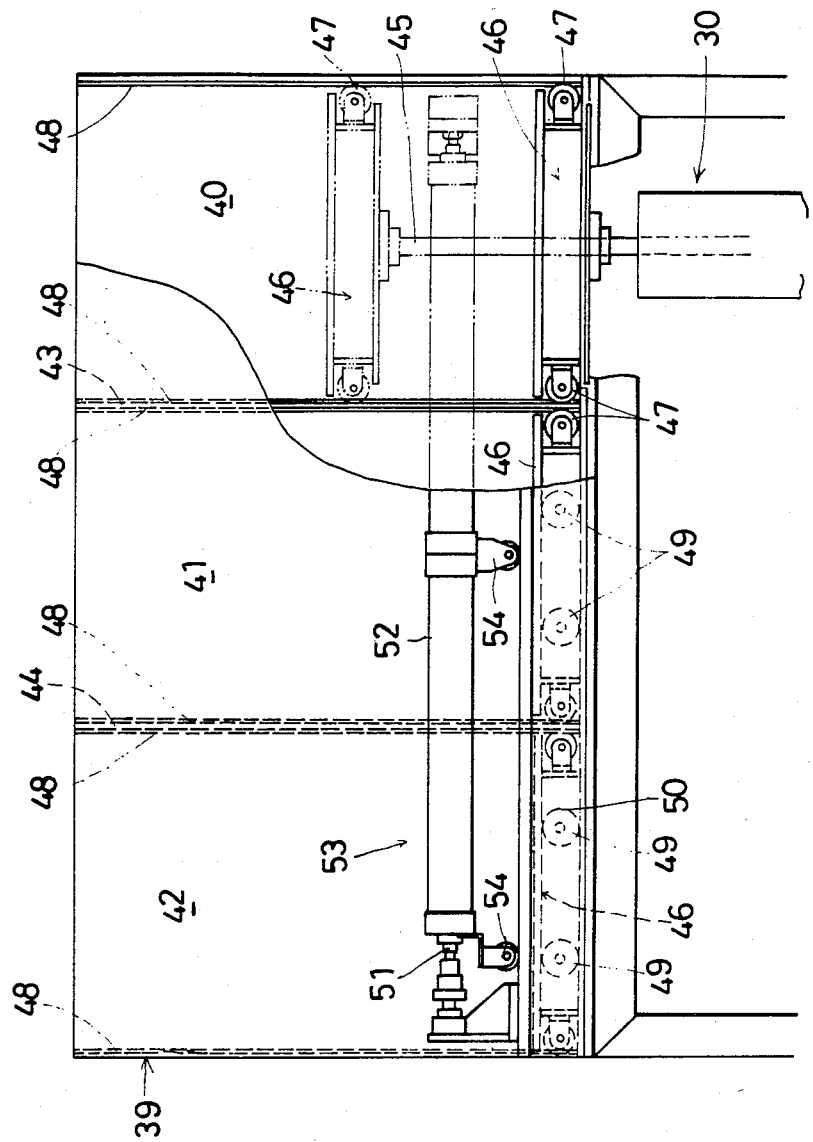

PROCESS FOR DISTRIBUTING DISKS AND APPARATUS THEREFOR

BACKGROUND AND SUMMARY OF THE INVENTION

This invention relates to a process for distributing disks such as can covers or lids, bottle caps or the like and an apparatus for the same.

As for a process and an apparatus of this kind, there has been hitherto known a device wherein a row of stacked disks is conveyed at a continuous constant speed, and then is divided one after another, at every predetermined number thereof, so that cylindrical stack bodies may be obtained separately therefrom one after another. The cylindrical bodies thus obtained and arranged in a row in mutually parallel and contact relationship are rolled down one by one from an upper portion of a guide passage comprising an inclined plate to a distributing position located at a lower portion thereof. Further, such cylindrical stack bodies located at the distributing position are dropped one by one to either one side of the right or the left of a central distributing projection provided below. See Japanese Patent Publication No. Showa 55 (1980)-48048.

This type of process is defective in that the cylindrical stack body is liable to break. More particularly, the cylindrical stack body may lose its shape in the course of being rolled down to the distributing position. All the working steps of the process line must be stopped when any one of the cylindrical stack bodies is deformed out of shape or is broken into individual disks.

The present invention has for its object to provide a process which is free from the above inconvenience. The process provides for conveying a row of stacked disks continuously at a constant speed, dividing the row of stacked disks at every predetermined number thereof, one after another to form cylindrical stack bodies of the stacked disks, supplying the cylindrical stack bodies to a lower portion of an inclined passage so that the same may be at right angles to the longitudinal direction of the inclined passage, pushing up the same, holding the same at an upper stage position of the inclined passage so that a room space for receiving the following cylindrical stack succeeding to the same body may be given to the lower portion of the inclined passage before the following cylindrical stack body is supplied to the lower portion of the inclined passage. Further, the process provides for releasing the holding of the cylindrical stack body, pushing up the cylindrical stack bodies arranged in a row in mutually parallel and contact relationship, holding them at the upper stage position for providing room space, releasing the holding of the same in the cylindrical stack bodies, supplying the following cylindrical stack body into the room space and distributing at least two of the cylinder stack bodies to the side of the inclined passage while the pushing up step, the holding step, the releasing step and the supplying step as mentioned above are repeated.

The present invention has an additional object of providing an apparatus for carrying out the above process, which comprises a slide cutter means for dividing a row of stacked disks, which is being conveyed at a continuous constant speed, at every predetermined number one after another to form cylindrical stack bodies therefrom. Further, the apparatus supplies the cylindrical stack bodies one after another to an inclined passage which extends at right angles to the supplying direction of the slide cutter means and is gradually raised toward its forward end. A push-up means is provided for intermittently pushing upwards every cylindrical body supplied one after another to the lower portion of the inclined passage, a holding means for holding upwardly moved one or more cylindrical stack bodies at the upper stage position on the lower portion of the inclined passage, and a distributing means for distributing at least two of the cylindrical stack bodies arranged in a row and in mutual parallel and contact relations to the side of the inclined passage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a diagrammatical side view of an important portion of the same;

FIGS. 4 (1)-4 (10) and 5 (1)-5 (6) are diagrams for explaining operation processes of the same;

FIG. 7 is a side view, partly in section, of a storage box portion thereof.

DETAILED DESCRIPTION OF THE INVENTION

Figure 1:
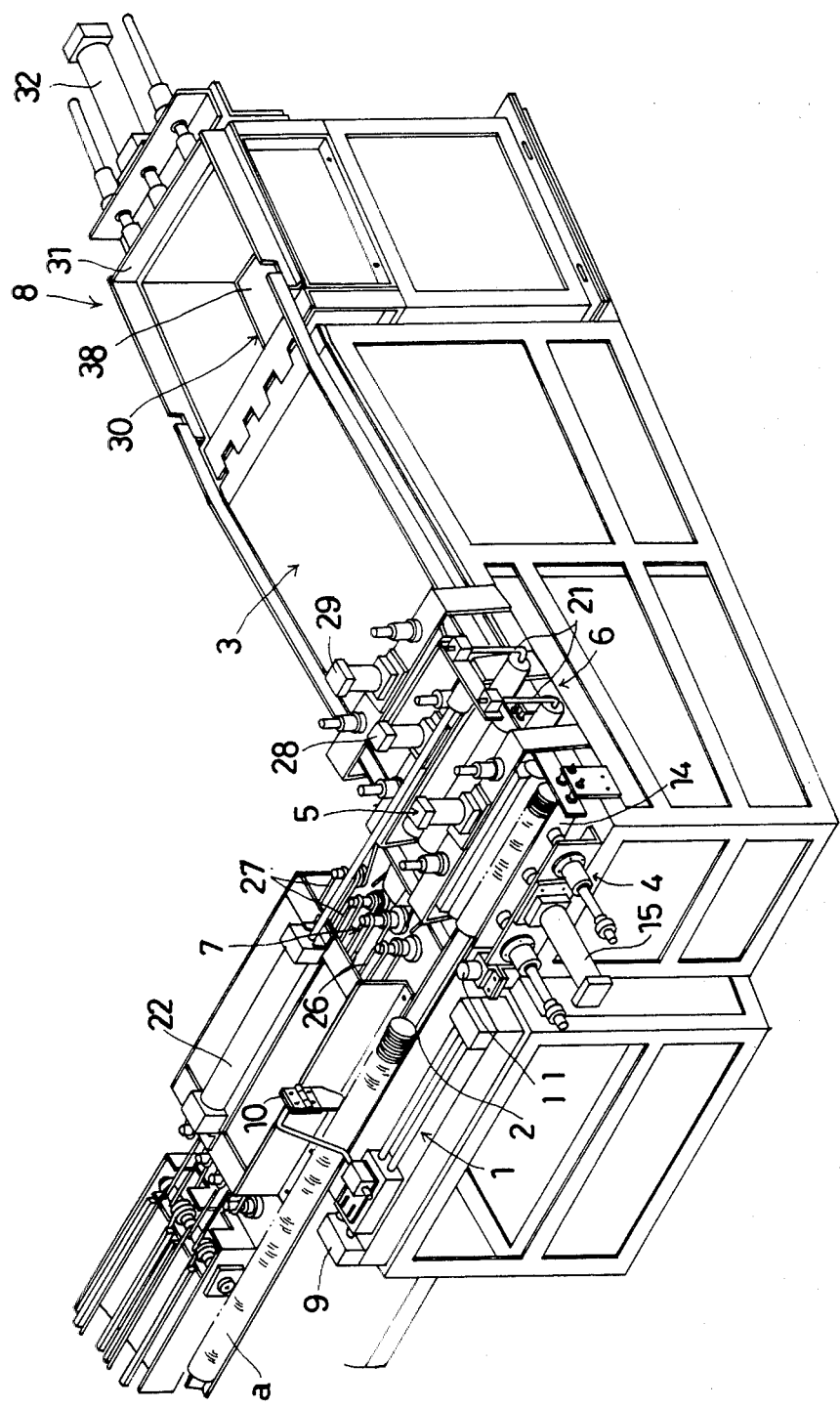
FIG. 1 is a perspective view of one example of the apparatus of the present invention.
Figure 2:
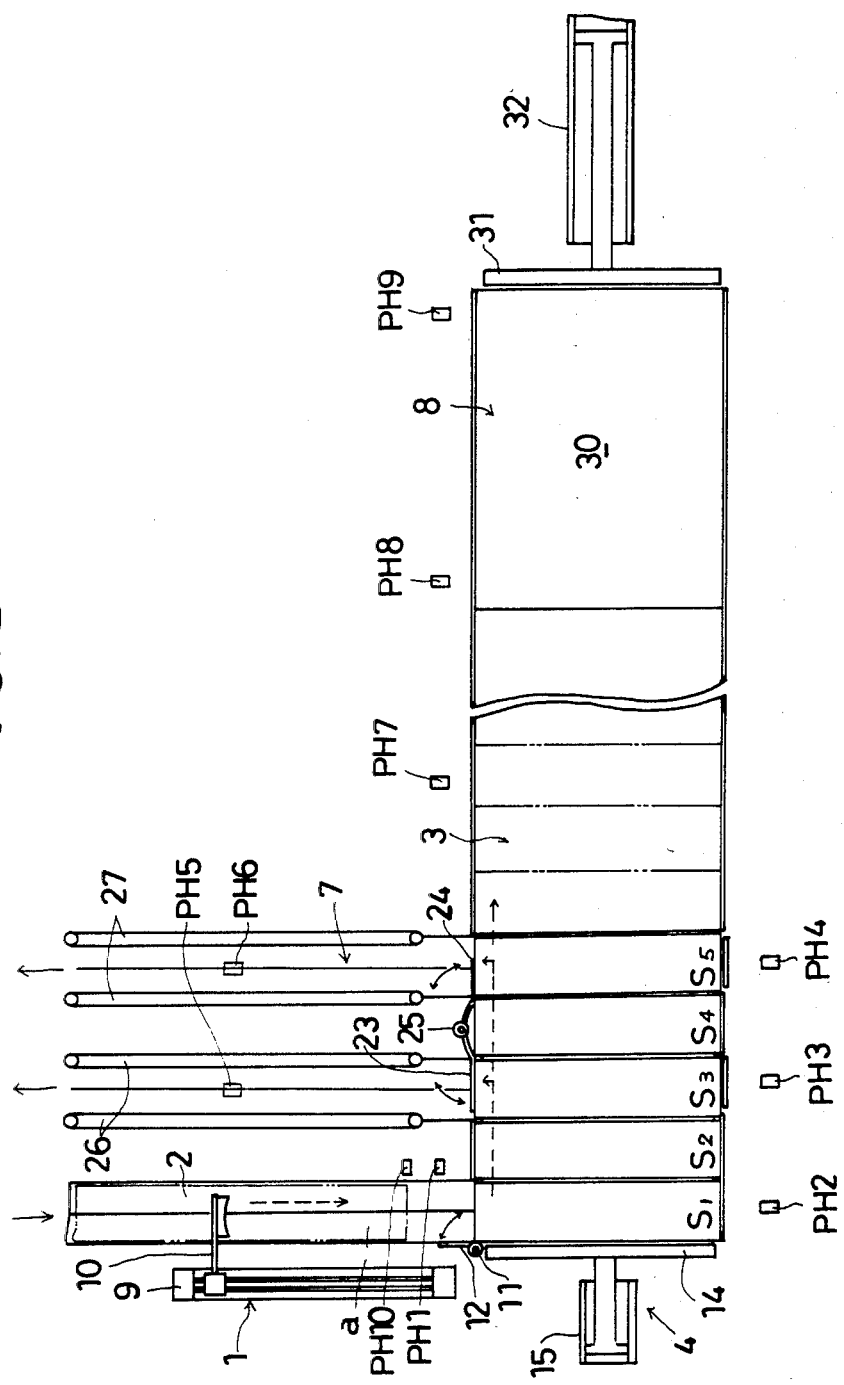
FIG. 2 is a diagrammatical plan view of an important portion thereof.

FIGS. 1 to 5 show one example of the present invention. As shown in FIGS. 1-3, an apparatus for carrying out the process of the present invention comprises a slide cutter means 1 provided in parallel with a V groove conduit 2 through which a row of stacked disks such as shell lids a for cans is conveyed at a continuous constant speed in one direction. An inclined passage 3 is provided so as to extend adjacent to and at right angles to the extreme end of the V groove conduit 2 and to be gradually raised towards its forward end. A push-up means 4 is located in opposition to the extreme end of the lower portion of the inclined passage 3. A holding means 5 is provided wherein the parts are disposed above, below and along the inclined passage 3, and a distribution means 6 is provided on one side of the inclined passage 3. The apparatus is additionally provided with a delivery means 7 on the opposite side of the inclined passage 3 so as to face the distribution means 6 and a feeding means 8 positioned above an upper portion of the inclined passage 3.

The apparatus illustrated in FIG. 1 will be explained in more detail with reference to FIGS. 2 and 3.

The V groove conduit 2 is a guide passage through which the row of stacked shell lids a arranged by a down stacker (not illustrated) is conveyed at a continuous constant speed from a lining machine (not shown). The slide cutter means 1 is provided in parallel with the conduit 2 and is arranged so that the foremost one of the row of disks a conveyed through the V groove conduit 2 is detected by a photoelectric tube PH 1, a cylinder 9 thereof is driven and thereby the row of stacked disks a is cut so that a predetermined number thereof may be separated therefrom to be formed into a cylindrical stack body A by a rapid supply of a slide cutter 10. Further, the cylindrical stack body A is supplied to a space $S_1$ on the extreme end of the lower portion of the inclined passage 3 by a pushing operation of the slide cutter 10. By a signal, generated at the terminal end of the operation of the cylinder 9, through a hydraulic rotor 11 provided on the side of an outlet end portion of the V groove conduit 2, a gate 12 is caused to swing to shut the outlet opening of the conduit passage, and thereafter, the cylinder 9 is returned to its original position, and again the same operations as above are repeated.

The push-up means 4 comprises a cylinder 15 which is provided outside the lower end of the inclined passage 3, with a push-up rod 14 extending at right angles to the longitudinal direction of the inclined passage 3. The push-up means 4 is arranged so that if the cylindrical stack body A in the space $S_1$ is detected by a photoelectric tube $PH_2$, the cylinder 15 is driven and thereby the cylindrical stack body A is pushed upwards to a space $S_2$ on the upper stage position at the lower region of the inclined passage 3. After the cylindrical stack body A is held in the space $S_2$ by the operation of the holding means 5 as described below, the cylinder 15 is returned to its original position. At the same time, by a signal generated at that time through the rotor 11, the gate 12 is caused to swing to open the outlet opening of the V groove conduit 2.

The holding means 5 comprises a cylinder 17 having an engaging rod 16 which is movably mounted upwards and downwards above the upper surface of the inclined passage 3 and at a lower edge of the space $S_2$. A cylinder 19 having an engaging frame 18 in the shape of the teeth of a comb is movably mounted below the lower surface of the inclined passage 3 so that the teeth may appear above and disappear below the surface of the inclined passage 3. The engaging frame 18 is constructed so that plural engaging plates 20, each of which is designed to be brought into engagement with the whole length of the cylindrical stack body A, are disposed in parallel so as to leave spaces $S_2$, $S_3$, $S_4$, $S_5$ therebetween. Each space $S_2$, $S_3$, $S_4$ and $S_5$ is provided for receiving a cylindrical stack body A. When the cylindrical body A in the space $S_1$ is intended to be pushed up to the space $S_2$ by the operation of the push-up means 4, as previously described, the engaging rod 16 and the engaging frame 18 of the holding means 5 are respectively retracted. When the cylindrical stack body A first reaches the space $S_2$, the engaging frame 18 is advanced so that the engaging plates 20 project above the upper surface of the inclined passage 3 for engagement with the cylindrical body A in the space $S_2$. From a signal from the cylinder 15 of the push-up means 4, the engaging rod 16 is moved downwards to hold the cylindrical body A from above.

The distributing means 6 comprises a cylinder 22 for reciprocating across and above the cylindrical passage 3, and a pair of push-out rods 21 diverged from the cylinder 22 and disposed to face one end of the spaces $S_3$, $S_4$ of the inclined passage 3. The distributing means 6 is arranged so that when, by the operation of the slide cutter means 1, the push-up means 4 and the holding means 5, the cylindrical stack bodies A are brought to be held in the spaces $S_3$, $S_5$ on the inclined passage 3, this operation is detected by a photoelectric tube PH 4. Thereafter, gates 23 and 24 of the delivery means 7 on the opposite side of the inclined passage 3 are caused to open through operation of a hydraulic rotor 25. By a signal generated on the completion of the opening operation of the rotor 25, the cylinder 22 is driven, and thereby the two cylindrical stack bodies A in the spaces $S_3$, $S_5$ are pushed from the side by the push-out rods 21 and moved to the discharging means 7. Immediately after the completion of the advance movement of the push-out rods 21, the same are returned to the original positions, and by a signal generated on this return movement the rotor 25 is driven and the gates 23 and 24 are closed.

The delivery means 7 comprises a pair of rope conveyors 26 and 27 each of which is composed of a pair of endless conveyor ropes 26, 26, or 27, 27 disposed along both sides of each V groove conduit at its open open end and is connected to each of the respective gates 23, 24 adjacent to the spaces $S_3$, $S_5$ of the inclined passage 3. The delivery means 7 is arranged so that the two cylindrical stack bodies A pushed out by the distributing means 6 are held and moved by the respective rope conveyors 26, 27 so as to be delivered to respective easy open closure forming press machines (not illustrated).

The respective rope conveyors 26, 27 of the delivery means 7 are provided with respective photoelectric tubes PH 5, PH 6 and are arranged so as to be stopped when the easy open closure forming pressing machines are stopped in operation. During a condition when the rope conveyors 26, 27 are stopped and the cylindrical stack bodies A are pushed out unto the rope type conveyors 26, 27 by the operation of the distributing means 6, and when this condition is detected by the photoelectric tubes PH 5, PH 6, and additionally the foregoing photoelectric tubes PH 3, PH 4 detect a condition where the cylindrical bodies A are held in the spaces $S_3$, $S_5$ of the inclined passage 3, then the distributing means 6 is stopped in operation. On this occasion, the slide cutter means 1, the push-up means 4 and the holding means 5 are continued in operation, and thereby the cylindrical stack bodies A are continuously supplied and moved up to the upper portion of the inclined passage 3 for being stored at that portion as reserved space cylindrical stack bodies.

The preliminary supply means 8, provided on the upper portion of the inclined passage 3, may be utilized for a first procedure for storing the foregoing cylindrical stack bodies A and a second procedure for resupplying the reserved spare cylindrical stack bodies A to the lower portion of the inclined passage 3. A distribution position of the distributing means 6, on an occasion when the continuous constant speed conveying of the disks a through the V groove conduit 2 is stopped, includes the actuation of a pair of engaging means 28, 29 for holding the cylindrical bodies A that are disposed above the upper portion of the inclined passage 3. A lift means 30 is provided adjacent to the upper extreme end of the inclined passage 3, and a cylinder 32 having a laterally extending push-out rod 31 is so arranged to reciprocate and to face toward the upper extreme end of the inclined passage 3.

In the case of carrying out the procedure for storing the cylindrical stack bodies A, the preliminary supply means 8 operates in such a manner so that the photoelectric tubes PH 3, PH 4 detect the cylindrical stack bodies A in the spaces $S_3$, $S_5$ of the inclined passage 3, and additionally the photoelectric tube PH 2 detects the cylindrical stack body A delivered into the space $S_1$ by the slide cutter means 1, cylinders 33, 34 of the engaging means 28, 29 are driven to lift engaging rods 35, 36. Under this condition, when the cylindrical stack bodies A are pushed up to be moved below the engaging means 28, 29 by the foregoing respective operations of the push-up means 4 and the holding means 5, and the engaging means 28, 29 are moved down, the cylindrical stack bodies A are engaged thereby. If the above operations are repeated, the cylindrical stack bodies A are supplied to be supported by a table 38 of the lift means 30 adjacent to the upper extreme end of the inclined passage 3. When photoelectric tubes PH 7, PH 8 and PH 9 detect the respective cylindrical stack bodies A, the lift means 30 is operated so that the table 38 is lowered by a cylinder 37 by a distance that is equal to the height, that is, the diameter of the cylindrical stack body A. Thereafter, almost the same operations are repeated, and thereby a row of the cylindrical bodies A, arranged in mutually parallel and contact relationship, is piled one upon another in layers to be reserved on the lift means 30.

When the continuous constant speed conveying of the disks a through the V groove conduit 2 is not carried out and a photoelectric tube PH 10 does not detect the closures a for a predetermined length of time, the preliminary supply means 8 is changed over to performing a supply procedure such that the spare cylindrical stack bodies A reserved at the upper portion of the inclined passage 3 and at the lift means 30 are pushed and rolled down to be supplied to the distribution position. Namely, when the photoelectric tubes PH 3, PH 4 do not detect an object due to the non-existence of the cylindrical bodies A in the spaces $S_3$, $S_5$ of the inclined passage 3, only the cylinder 19 of the holding means 5 is driven and thereby the engaging frame 18 is caused to sink below the inclined passage 3.

By a signal generated at that time, the cylinders 33, 34 of the engaging means 28, 29 are driven to move the engaging rods 35, 36 upwards, so that the cylindrical stack bodies A previously engaged therewith are released therefrom and are rolled down along on the inclined passage 3. Thus, when the spare cylindrical stack bodies A are rolled down the inclined passage 3 and are brought into engagement with the cylindrical stack bodies A held in the spaces $S_2$, $S_3$, they are held by the engaging rod 16 and consequently are stopped at the spaces $S_4$, $S_5$, and are also held in place by the holding means 5. If, from this condition, the distributing means 6 is operated by the detecting operations of the photoelectric tubes PH 3, PH 4, the cylindrical bodies A in the spaces $S_3$, $S_5$ are pushed sideways to be distributed to the delivery means 7. Thereafter, almost the same operations as above are repeated.

Subsequently, if the photoelectric tube PH 7 does not detect an object due to the non-existence of the cylindrical body A on the upper portion of the inclined passage 3, the push-out rod 31 of the cylinder 32 is operated to be advanced. Thereby, the reserved cylindrical bodies A of the uppermost row on the lift means 30 are pushed out to the inclined passage 3. Thereafter, first the cylindrical bodies A are caught by the engaging rod 36 of the engaging means 29, and second, the cylindrical bodies A are released from engagement therewith, and are rolled down and are then caught by the engaging rod 35 of the engaging means 28 so as to be positioned ready to be rolled down to be supplied to the distributing position. Thereafter, the cylindrical stack bodies A are rolled down to the distribution position according to the operation condition of the distributing means 6 as described before. In this example, if the photoelectric tube PH 8 does not detect an object due to the non-existence of any reserved cylindrical stack body A at the uppermost position on the lift means 30 the row of the cylindrical stack bodies A of the lower layer are moved upwards by the cylinder 37 of the lift means 30 so as to be positioned to be pushed out by the rod 31 of the cylinder 32.

Next, the progressive operation of the foregoing apparatus will be explained with reference to FIGS. 4 and 5 showing the same diagrammatically.

A row of stacked shell lids a for cans conveyed at a continuous constant speed through the V groove conduit 2 is cut and divided by the slide cutter means 1 so that a predetermined number thereof may be separated therefrom and be formed into the cylindrical body $A_1$. The cylindrical stack body $A_1$ is pushed to be supplied by the slide cutter 1 into the space $S_1$ of the inclined passage 3. The cylindrical stack body $A_1$ in the space $S_1$ is then pushed upwards by the push-up means 4 into the space $S_2$ of the inclined passage 3 as shown in FIG. 4 (1). After the cylindrical stack body $A_1$ is held by the engaging rod 16 of the holding means 5, while the space $S_1$ is emptied, as shown in FIG. 4 (2), the following cylindrical body $A_2$ is divided from the row of disks a and is pushed to be supplied by the slide cutter means 1 into the space $S_1$ of the inclined passage 3 in almost the same manner as above. If almost the same operations as above are repeated and if the cylindrical stack bodies $A_1$–$A_4$ are held in the spaces $S_2$–$S_5$ by the engaging rod 16 of the holding means 5 as shown in FIG. 4 (3), the photoelectric tubes Ph 3, PH 4 detect the above condition and consequently the gates 23, 24 are opened through the hydraulic rotor 25. By the operation of the diverged push-out rods 22 of the distributing means 6 the cylindrical bodies $A_1$, $A_3$ are pushed sidewards to be distributed to the rope conveyors 26, 27 of the delivery means 7, so that the spaces $S_1$, $S_3$ are emptied, as shown in FIG. 4 (4).

If, however, the easy open closure forming press machines are in an inoperative condition or are stopped because of a malfunction or the like, and the cylindrical stack bodies $A_1$, $A_3$ are not delivered to remain in the rope conveyors 26, 27 the photoelectric tubes PH 5, PH 6 become operative and detect this condition. Under this detection condition, when the cylindrical stack bodies $A_2$, $A_4$, $A_5$, $A_6$ are intermittently moved upwards in sequential order and are supplied to be positioned in the spaces $S_2$–$S_4$, as shown in FIGS. 4 (5) and 4 (6), by the respective repeated operations of the push-up means 4 and the holding means 5, the photoelectric tubes PH 3, PH 4 become operative to detect the cylindrical stack bodies $A_2$, $A_5$. Thereafter, the distributing means 6 is made inoperative and no distributing operation thereof is made because of the fact that the photoelectric tubes PH 5, PH 6 are kept in an operative condition to detect the cylindrical stack bodies $A_1$, $A_3$ in the rope conveyors 26, 27. Accordingly, the cylindrical stack bodies $A_2$, $A_4$, $A_5$, $A_6$ are moved upwards further towards the upper portion of the inclined passage 3. If, on this occasion, the photoelectric tube PH 2 detects the cylindrical stack body $A_7$ supplied in the space $S_1$, as shown in FIG. 4 (6), the engaging rods 35, 36 of the engaging means 28, 29 are lifted for allowing the cylindrical stack bodies $A_2$, $A_4$, $A_5$, $A_6$ to move upwards. Thereafter, in almost the same manner as above, the cylindrical stack bodies $A_2$, $A_4$, $A_5$, $A_6$, $A_7$ . . . are intermittently moved upwards in sequential order as far as the table 38 of the lift means 30 waiting adjacent to the upper extreme end of the inclined passage 3. When the photoelectric tubes PH 8, PH 9 detect the cylindrical stack bodies $A_6$, $A_2$, the table 38 thereof is lowered by the cylinder 37 of the lift means 30. The above operations are repeated, and the cylindrical stack bodies $A_2$, $A_4$ . . . are piled one upon another in layers on the lift means 30, as shown in FIG. 4 (7).

If, from this condition, the easy open closure pressing machines resume operation and at the same time the rope conveyors 26, 27 of the delivery means 7 are operated again so tht the cylindrical stack bodies $A_1$, $A_3$ previously retained therein are discharged therefrom and the photoelectric tubes PH 5, PH 6 are brought into their nondetecting conditions, the detecting by the photoelectric tubes PH 3, PH 4 of the existence of the cylindrical bodies $A_{17}$, $A_{15}$ in the spaces $S_3$, $S_5$ on the inclined passage 3, causes the distributing means 6 to operate so that the cylindrical stack bodies $A_{17}$, $A_{15}$ are pushed out sideways by the operation of the cylinder 22, that is, by the push-out rods 21 thereof to the discharging means 7, as shown in FIG. 4 (8). Thereafter, the cylindrical stack bodies $A_{16}$, $A_{19}$ are moved upwards intermittently by the repeated operations of the push-up means 4 and the holding means 5 as shown in FIG. 4 (8)–(10), are then distributed sideways by the distributing means 6, and the above operations are repeated.

If, on the other hand, the continuous constant speed conveying of the row of the stacked disks a through the V groove conduit 2 is not effected, and the photoelectric tube PH 10 does not detect the front disk a of the row thereof for a predetermined time length, the preliminary supply means 8 is changed over to such a supply procedure that the reserved space cylindrical stack bodies A on the upper portion of the inclined passage 3 and on the lift means 30 are pushed and rolled down toward the distributing position of the inclined passage 3. Namely, when the photoelectric tubes PH 3, PH 4 do not detect an object due to the nonexistence of the cylindrical stack bodies A in the spaces $S_3$, $S_5$ of the inclined passage 3, as shown in FIG. 5 (1), only the cylinder 19 of the holding means 5 is operated, so that the plates engaging frame 18 are caused to sink, and thereby the cylindrical stack bodies $A_{14}$, $A_{13}$ caught by the engaging rod 35 of the holding means 28 and located at the upper portion of the inclined passage 3 are allowed to become ready to be rolled down into the spaces $S_4$, $S_5$. Accordingly, by the release of the engagement with the engaging rod 35 of the engaging means 28, the cylindrical stack bodies $A_{14}$, $A_{13}$ are allowed to roll down into the space $S_4$, $S_5$, as shown in FIG. 5 (2), and are held by the engaging rod 16 of the cylinder 17 and the engaging frame 18 which again is moved upwards, as shown in FIG. 5 (3).

If the photelectric tubes PH 3, PH 4 detect the cylindrical stack bodies $A_{13}$, $A_{16}$ in the spaces $S_3$, $S_5$ of the inclined passage 3, the distributing means 6 is operated and, the cylindrical bodies $A_{13}$, $A_{16}$ in the spaces $S_3$, $S_5$ of the inclined passage 3, the distributing means 6 is operated and, the cylindrical bodies $A_{13}$, $A_{16}$ are pushed out sideways to be distributed to the delivery means 7. When, in the meanwhile, the photoelectric tube PH 7 does not detect an object due to the nonexistence of the cylindrical stack body A, as shown in FIG. 5 (3), the cylinder 32 of the preliminary supply means 8 is driven so that the cylindrical stack bodies $A_{10}$–$A_7$ at the uppermost position on the table 38 of the lift means 30 are pushed out by the push-out rod 31 for being rolled down to the upper portion of the inclined passage 3, as shown in FIG. 5 (4).

During this operation, as shown in FIG. 5 (4), the downwardly rolling thereof is first stopped by the engaging rod 36 of the engaging means 29, and, in the meanwhile, the cylindrical stack bodies $A_{11}$, $A_{12}$ are allowed to be rolled down into the spaces $S_4$, $S_5$ of the inclined passage 3 by release of the engagement of the engaging rod 35 of the engaging means 28 therewith. Thereafter, the cylindrical stack bodies $A_{10}$–$A_7$ are allowed to be pushed and rolled down to the engaging means 28, which is again moved downwards, by the release of the engagement of the engaging rod 36 of the engaging means 29 therewith, and the cylindrical bodies $A_{10}$, $A_9$ are again engaged with the rod 36 in the reserved positions ready to be rolled down as shown in FIG. 5 (5). Thereafter, when the push-out rod 31 of the preliminary supply means 8 is returned to its original position, the table 38 of the left means 30 is elevated, as shown in FIG. 5 (6).

By repeating the above operations, the necessary repeated distributing operations using the spare cylindrical stack bodies can be carried out.

In the foregoing example apparatus, the inclined passage 3 has, in general, any gradient in the range of 10–20 degrees, but preferably in the range of 12–15 degrees. In a case where the gradient thereof is below 10 degrees, difficulties arise when the cylindrical stack bodies are rolled down along on the inclined passage 3 from the preliminary supply means 8. It is difficult for the cylindrical stack bodies to make a smooth orderly rolling movement and also the mutually adjacent cylindrical bodies cannot be rolled while being always kept in their mutually contact relationship and are apt to be separated one from another, so that the cylindrical form thereof is liable to break into individual disks, in other words, be deformed out of shape. In a case where the gradient thereof is above 20 degrees, difficulties arise when the cylindrical body is moved up from the inclined passage to the table of the lift means, the same is jumped up at the upper extreme end of the inclined passage, so that the cylindrical stack form thereof is liable to break. Additionally, when the cylindrical stack body from the preliminary supply means 8 is rolled down along the inclined passage and is caught by the engaging means, the same is given a comparatively large shock and is liable to break in form and also suffer from damage or deformation or the like.

Figure 6:
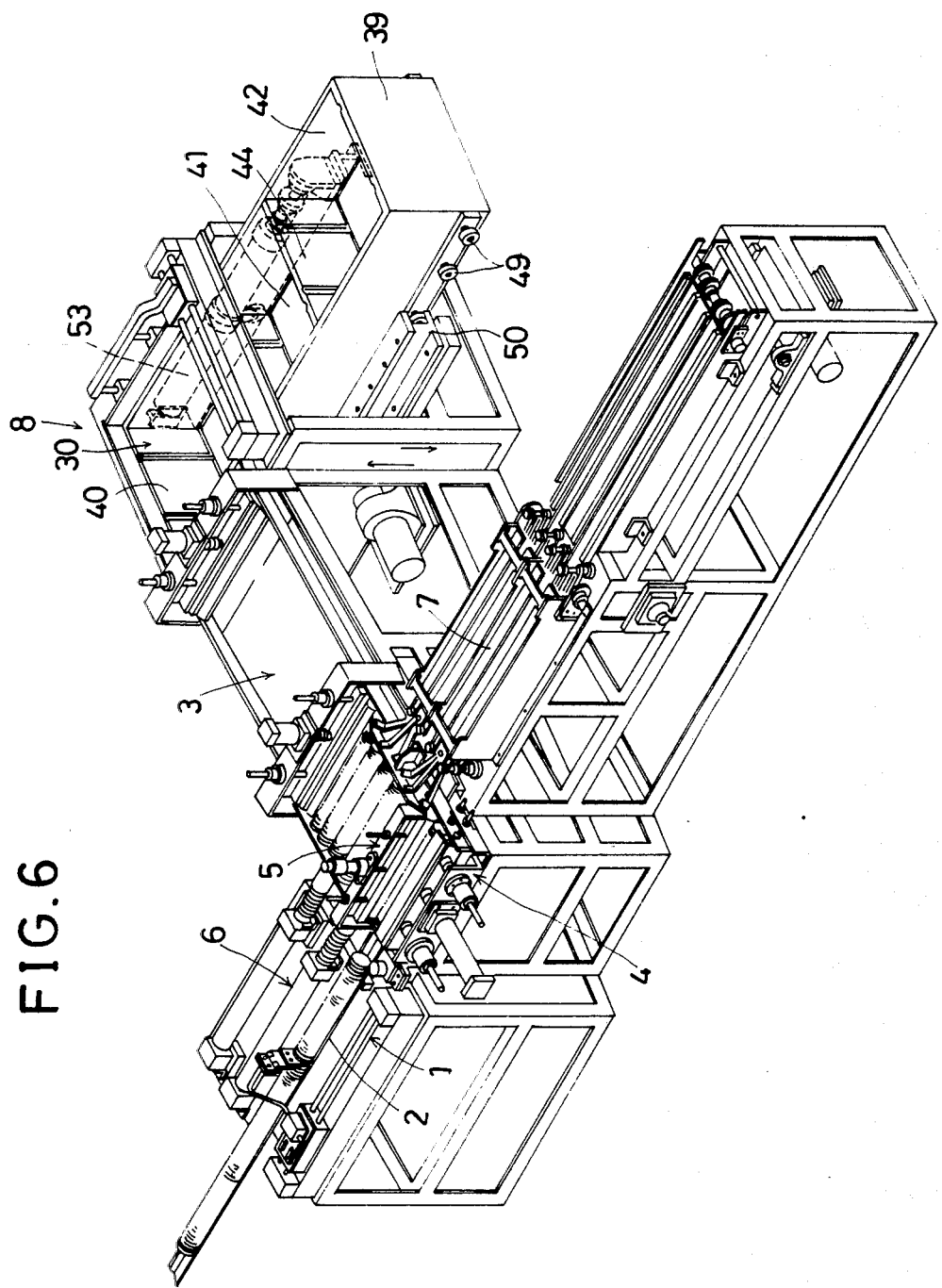
FIG. 6 is a perspective view of a modified example apparatus of this invention.

FIGS. 6 and 7 show a modified example of this invention apparatus. This example apparatus is equal in construction and operation to the foregoing example apparatus, except that the delivery means 7 is so provided as to extend in the longitudinal direction of the V groove conduit 2. In addition, a storage box 39 is provided which has three compartment rooms 40, 41, 42 each for storing cylindrical stack bodies which are movable in the lateral direction to cross the inclined passage 3. More particularly, as shown clearly in FIG. 7, the storage box 39 has two partition walls 43, 44 for dividing the interior thereof into the three compartment rooms 40, 41, 42 each for storing the cylindrical bodies A in rows and in orderly stacked condition, and each of these rooms 40, 41, 42 has at its bottom portion a bottom plate 46 arranged to be moved upwards and downwards by a piston rod 45 of the lift means 30. Each bottom plate 46 is arranged to be brought into engagement with and stopped by an inward edge of the room at the lowest position thereof. Numeral 47 denotes a guide roller for upward and downward movements of each bottom plate 46, and numeral 48 denotes a guide groove for each roller 47.

The storage box 39 is supported on rails 50, 50 through rollers 49 provided on both side surfaces thereof, and each bottom plate 46 is arranged to be movable by the engagement with the top of the piston rod 45 of the lift means 30. For achieving the lateral movement of the storage box 39, there is provided such a cylinder means 53 that a piston rod 51 thereof is fixed to the rail 50, and a cylinder 52 thereof is fixed to the room 40 side wall of the box 39 so that the storage box 39 may be advanced and retreated by expansion and contraction of the piston rod 51 in relation to the cylinder 52. A caster 54 is provided for moving above on the rail 50 for ensuring that the movement of the cylinder 52 is smooth. Thus, the cylindrical stack bodies A can be stored in great quantities in the three rooms 40, 41, 42 of the storage box 39.

Thus, according to a first feature of this invention, a row of stacked disks such as can lids, bottle caps or the like is conveyed continuously at a constant speed and is subjected to repeated dividing operations so that cylindrical stack bodies comprising a predetermined number of stacked disks may be obtained separately from the row and be supplied one after another to the lower portion of an inclined passage so as to be at right angles to the inclined passage. The cylindrical stack bodies thus supplied are moved up intermittently one after another towards an upper portion thereof, so that plural cylindrical stack bodies can be delivered to a distribution position of the inclined passage without being deformed out of shape. Also a plurality of stack bodies can be distributed without fail to the side of the inclined passage at the distribution position.

According to another feature of this invention, the cylindrical stack bodies moved upwardly intermittently are sent to the upper portion of the inclined passage so that they may be reserved as spare ones at the upper portion. The reserved space cylindrical stack bodies may be in a standby position to be able to be rolled down to the distribution position when necessary.

According to another feature of this invention, when the supply of the cylindrical stack body to the lower portion of the inclined passage is stopped, the reserved cylindrical bodies may be rolled down from the upper portion thereof to the distribution position, so that the distributing operation of the cylindrical stack bodies can be continued without fail even if the regular supply of the cylindrical stack bodies to the distribution position is stopped.

We claim:

1. An apparatus for distributing disks comprising:
    slide cutter means for dividing a row of stacked disks being conveyed at a continuous constant speed at every predetermined number thereof, one after another, to form cylindrical stacked bodies thereof and supplying every cylindrical stacked body one after another to an inclined passage which extends at substantially right angles to the supplying direction of the slide cutter means and is gradually raised toward its forward end;
    push-up means for intermittently pushing upwards the cylindrical stacked bodies supplied one after another to the lower portion of the inclined passage;
    holding means for holding upwardly moved one or more cylindrical stacked bodies at an upper stage position on the lower portion of the inclined passage, said holding means includes a cylinder operatively connected to an engaging frame having a plurality of engaging plates projecting upwardly therefrom for positioning said rows of stacked bodies on said inclined passage; and
    distributing means for distributing at least two of the cylindrical stacked bodies arranged in a row and in mutual parallel relationship on the inclined passage to a side portion of the inclined passage.

2. An apparatus according to claim 1, which further includes preliminary supply means which is provided on the upper portion of the inclined passage and is prepared for rolling down one or more reserved cylindrical body to the distributing position of the distributing means.

3. An apparatus for distributing disks comprising:
    slide cutter means for dividing a row of stacked disks being conveyed at a continuous constant speed at every predetermined number thereof, one after another, to form cylindrical stack bodies thereof;
    an inclined passage positioned adjacent to and extending at substantially a right angle with respect to the conveying direction of said stacked disks, said inclined passage including a lower portion and being inclined upwardly to a forward end;
    said slide cutter supplying every cylindrical stacked body one after another to said inclined passage;
    push-up means for intermittently pushing upwards the cylindrical stacked bodies supplied one after another to the lower portion of the inclined passage;
    holding means for holding upwardly moved one or more cylindrical stacked bodies at an upper stage position on the lower portion of the inclined passage, said holding means includes a cylinder operatively connected to an engaging frame having a plurality of engaging plates projecting upwardly therefrom for positioning said rows of stacked bodies on said inclined passage; and
    distributing means for distributing at least two of the cylindrical stacked bodies arranged in a row and in mutual parallel relationship on the inclined passage to a side portion of the inclined passage.

4. An apparatus for distributing disks according to claim 3, wherein said slide cutter means includes a cylinder being operatively attached to a slide cutter for advancing a predetermined number of stacked disks onto said inclined passage.

5. An apparatus for distributing disks according to claim 3, wherein said inclined passage is an inclined table surface extending from said lower portion adjacent to said slide cutter to said forward end adjacent to a feeding means for storing a plurality of stacked bodies.

6. An apparatus for distributing disks according to claim 5, wherein said push-up means includes a cylinder having push-up rod operatively attached thereto for intermittently advancing rows of stacked bodies from said lower portion toward said feeding means.

7. An apparatus for distributing disks according to claim 5, wherein said feeding means includes a housing having a lift means forming a bottom surface thereof for receiving a plurality of rows of stacked bodies.

8. An apparatus for distributing disks according to claim 7, and further including a cylinder having a push-out rod operatively connected thereto for selectively resupplying rows of stacked bodies positioned in said feeding means and returning the stacked bodies back to said inclined passage.

9. An apparatus for distributing disks according to claim 3, wherein said distributing means includes a cylinder operatively connected to push-out rods for selectively advancing at least two rows of stacked bodies to a delivery means for supplying the stacked bodies to pressing machines.

10. An apparatus for distributing disks according to claim 9, wherein said delivery means includes conveyors for supplying said stacked bodies to said pressing machines.

11. An apparatus for distributing disks according to claim 3, and further including photoelectric sensors for detecting the presence of rows of stacked bodies on said inclined passage.

12. An apparatus for distributing disks according to claim 11, wherein said photoelectric sensors generate a signal responsive to detected stacked bodies to actuate said push-up means and said holding means for supplying rows of stacked bodies to said distributing means.

13. An apparatus for distributing disks according to claim 7, wherein said housing of said feeding means is separated into a plurality of chambers for storing a plurality of rows of stacked bodies.

14. An apparatus for distributing disks according to claim 8, and further including photoelectric sensors operatively positioned adjacent said distributing means for detecting the presence of rows of stacked bodies on said inclined passage.

15. An apparatus for distributing disks according to claim 14, wherein said photoelectric sensors generate a signal responsive to detected stacked bodies to actuate said push-up means and said holding means for supplying rows of stacked bodies to said distributing means or to actuate said feeding means and said holding means for resupplying stacked bodies to said distributing means.

16. An apparatus for distributing disks according to claim 14, wherein said inclined passage is disposed at an angle between 10° to 20° with respect to said slide cutter means.

17. An apparatus for distributing disks comprising:
slide cutter means for dividing a row of stacked disks being conveyed at a continuous constant speed at every predetermined number thereof, one after another, to form cylindrical stack bodies thereof;
a feeding means for storing a plurality of stacked bodies;
an inclined passage positioned adjacent to and extending at substantially a right angle with respect to the conveying direction of said stacked disks, said inclined passage including a lower portion and being inclined upwardly to a forward end, said inclined passage is an inclined table surface extending from said lower portion adjacent to said slide cutter to said forward end adjacent to said feeding means;
said slide cutter supplying every cylindrical stacked body one after another to said inclined passage;
push-up means for intermittently pushing upwards the cylindrical stacked bodies supplied one after another to the lower portion of the inclined passage, said push-up means includes a cylinder having a push-up rod operatively attached thereto for intermittently advancing rows of stacked bodies from said lower portion toward said feeding means;
said feeding means includes a housing having a lift means forming a bottom surface thereof for receiving a plurality of rows of stacked bodies;
holding means for holding upwardly moved one or more cylindrical stacked bodies at an upper stage position on the lower portion of the inclined passage;
distributing means for distributing at least two of the cylindrical stacked bodies arranged in a row and in mutual parallel relationship on the inclined passage to a side portion of the inclined passage; and
a cylinder having a push-out rod operatively connected thereto for selectively resupplying rows of stacked bodies positioned in said feeding means and returning the stacked bodies back to said inclined passage.

18. An apparatus for distributing disks comprising:
slide cutter means for dividing a row of stacked disks being conveyed at a continuous constant speed at every predetermined number thereof, one after another, to form cylindrical stack bodies thereof;
an inclined passage positioned adjacent to and extending at substantially at right angle with respect to the conveying direction of said stacked disks, said inclined passage including a lower portion and being inclined upwardly to a forward end;
said slide cutter supplying every cylindrical stacked body one after another to said inclined passage;
push-up means for intermittently pushing upwards the cylindrical stacked bodies supplied one after another to the lower portion of the inclined passage;
holding means for holding upwardly moved one or more cylindrical stacked bodies at an upper stage position on the lower portion of the inclined passage;
distributing means for distributing at least two of the cylindrical stacked bodies arranged in a row and in mutual parallel relationship on the inclined passage to a side portion of the inclined passage; and
photoelectric sensors for detecting the presence of rows of stacked bodies on said inclined passage, said photoelectric sensors generate a signal responsive to detected stacked bodies to actuate said push-up means and said holding means for supplying rows of stacked bodies to said distributing means.

* * * * *